(No Model.)
M. L. G. WHEELER.
FORCE PUMP.
No. 253,141. Patented Jan. 31, 1882.
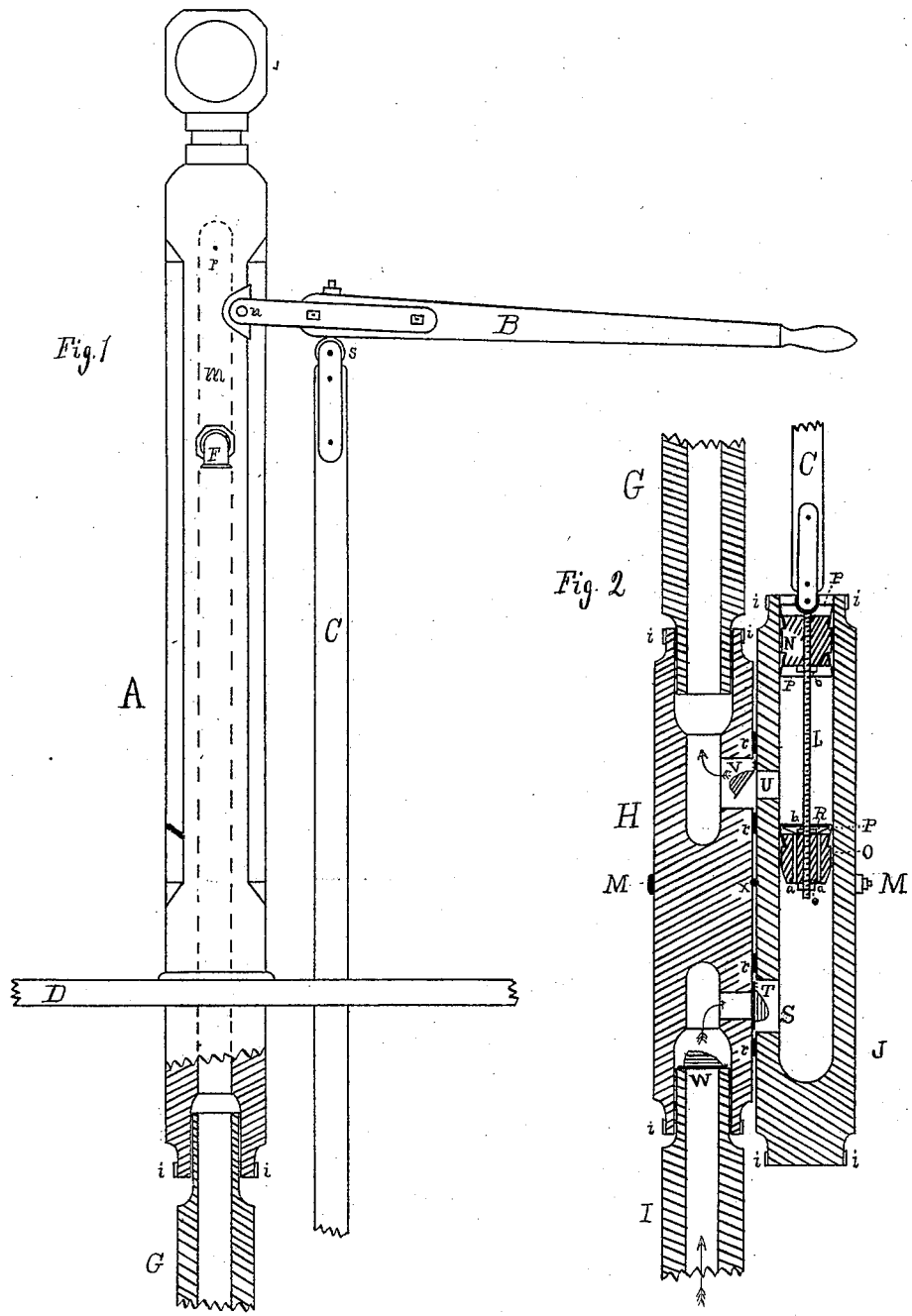
Witnesses:
N. P. Walden
Chas. R. Canfield.
Inventor.
M. L. G. Wheeler

UNITED STATES PATENT OFFICE.

MILO L. G. WHEELER, OF OREGON CITY, OREGON.

FORCE-PUMP.

SPECIFICATION forming part of Letters Patent No. 253,141, dated January 31, 1882.

Application filed January 11, 1881. (No model.)

*To all whom it may concern:*

Be it known that I, MILO LUTHER GATES WHEELER, of Oregon City, in the county of Clackamas and State of Oregon, have invented a new and Improved Force-Pump, of which the following is a specification.

In the drawings, Figure 1 shows an elevation of the pump-head as it appears above the well porch or cover, and also a portion of the pressure-tubing, sectioned through to show its connection with the pump-head. Fig. 2 represents that portion of the pump that is in the well, sectioned through to show its construction.

The letters in both figures refer to same parts.

A, Fig. 1, represents the pump-head, and G the pressure-tubing, extending down to cylinder H, Fig. 2.

B is the pump handle or lever, pivoted to head A, Fig. 1, at point n, and having the pitman C connected to it by the coupling s. The pitman C extends down, and is connected by a coupling with the metal rod L, Fig. 2, to which are rigidly attached the solid plunger or head N and the suction-bucket O. The rod L is threaded, and the plunger N and the suction-bucket O are held in place on it by the nuts b, c, and e. The plunger N and bucket O have a leather packing, P, surrounding them, which forms a water-tight joint with the walls of cylinder J. The packing P is placed on the upper side only of bucket O, as the pressure it sustains is always downward; but the plunger N is packed both on the upper and lower sides, as it acts in the capacity both of a suction-bucket and plunger.

The bucket O has a number of holes, a a, bored through it to permit the passage of water from the lower part of cylinder J to that part above the bucket O. A circular leather fly-valve, R, is secured to the top of bucket O by nut b, which valve serves to close the holes or openings a a of the bucket O as it makes its upstroke. The fly-valve R opens on the downstroke of the bucket O, by reason of the pressure of water from below, and allows the water to escape into the cylinder J above bucket O. The cylinder J is bored from the top end, and only part way through, being left solid at the bottom. It has openings S and U connecting it with the solid cylinder H. These openings have valves T and V, which close them when necessary. The suction-tube I also has a check-valve, W, which answers all the purposes of the valve T should the latter get out of order. The solid cylinder H is bored from each end, and only far enough in to connect with openings S and U, thus leaving a solid portion of the material of which it is composed between the suction-tube I and pressure-tube G. The cylinders H and J are fastened together by a clamp, M, placed around them. A pin, x, which is let half into each cylinder, serves to bring them into position and hold them there when the clamp M is screwed up. Rubber packing-rings r are placed between cylinders H and J, and surrounding openings S and U, which form tight joints and prevent any leakage at these points.

From the opening in bottom of solid cylinder H the suction-pipe I extends down to the water, while from the upper opening in said cylinder the pressure-tubing G extends up, and is connected with pump-head A. The cylinders H and J are placed as nearly as may be half-way between the top of the well and the water, but always within thirty feet of the water. When made of wood the lower end of pump-head A and both ends of cylinders H and J have iron bands i, which prevent them from checking or cracking. The pump-head A is bored, as shown by dotted lines, to a point far enough above spout F to form an air-chamber, m. The spout F is made of a straight piece of pipe screwed into the head A, and having an elbow on the outer end. This elbow is detachable, and may be removed when it is desired to attach hose. A plug, p, closes an opening into the air-chamber m, and may be removed when it is desired to use the pump as an ordinary lift-pump. D represents the well cover or porch.

The drawings represent but one suction and pressure cylinder; but as many as four can be used with one suction-tube and pump-head. The arrows in Fig. 2 show the direction that the water takes in flowing through the pump.

The drawings represent the appearance of a wooden pump, but it may be made of iron or any other suitable material.

Having thus described the construction of the pump, a description of its operation will now be given.

The pump is primed in the following manner: Before the bucket O and plunger N are inserted in the cylinder J the said cylinder is filled with water. In doing so the water enters through the valve V into the tube G, and stands at the same height in the tube G that it does in the cylinder J. When the cylinder is filled the bucket O is inserted, and as there are openings *a a* through it it makes its way down through the water without exerting any pressure on it. When the plunger N, however, enters the cylinder J the water below it and above the opening U is forced out through valve V as the plunger makes its downstroke. A few strokes of the lever B then extracts the air from suction-tube I, and draws up the water from below. The drawings represent the pump as primed, and the lever B and plunger N and bucket O as they appear at the beginning of downstroke. As the bucket O descends the water below it cannot escape down, as the valve T is closed, so the water remains stationary while the bucket O descends through it, the holes *a a* and fly-valve R allowing this action to take place. The water above the opening U and below the plunger N is forced downward by the descent of the latter, and escapes out through opening U and past valve V into pressure-tubing G. When the bucket O and plunger N begin their upstroke the valve V and the fly-valve R close and the valves T and W open, and as the bucket O and plunger N continue on the upstroke the column of water in the suction-tube I flows into and fills up the cylinder J below the bucket O. The water held between bucket O and plunger N remains between them until the upstroke is finished, and then, as the bucket O and plunger N begin to make the downstroke, the valves T and W close and valve V and fly-valve R open, and the operation first described is repeated, and so on as long as the handle or lever is worked up and down.

When it is desired to use this pump as an ordinary lift-pump only the plug *p* is removed and the air allowed to escape from air-chamber *m*, Fig. 1, and then when the handle B is put in motion the water will flow from spout F in a steady stream.

Having thus described my invention, what I claim as new, and desire to secure by Letters Patent, is—

1. In a pump, the combination of the cylinders H and J, the pin $x$, let into the surfaces of said cylinders, the clamp M, and the rubber packing-rings $r$, substantially as shown and described.

2. In a pump, the combination of the cylinder J, having ports U and S and valves V and T, the plunger N and bucket O, secured to the same lift-rod, and the cylinder H, communicating with cylinder J through the ports of the latter, whereby the weight of the column of water being lifted is supported in cylinder H instead of cylinder J, substantially as specified.

MILO LUTHER GATES WHEELER.

Witnesses:
CHAS. H. CANFIELD,
E. L. EASTHAM.